US010508640B2

(12) United States Patent
Murtha, Jr. et al.

(10) Patent No.: US 10,508,640 B2
(45) Date of Patent: *Dec. 17, 2019

(54) HINGE SYSTEM FOR AN ARTICULATED WAVE ENERGY CONVERSION SYSTEM

(71) Applicant: Murtech, Inc., Glen Burnie, MD (US)

(72) Inventors: Robert C. Murtha, Jr., Stevensville, MD (US); Jeffrey Cerquetti, Nottingham, MD (US)

(73) Assignee: Murtech, Inc., Glen Burnie, MD (US)

( * ) Notice: Subject to any disclaimer, the term of this patent is extended or adjusted under 35 U.S.C. 154(b) by 210 days.

This patent is subject to a terminal disclaimer.

(21) Appl. No.: 15/692,718

(22) Filed: Aug. 31, 2017

(65) Prior Publication Data

US 2018/0010570 A1    Jan. 11, 2018

Related U.S. Application Data

(63) Continuation of application No. PCT/US2016/022438, filed on Mar. 15, 2016.
(Continued)

(51) Int. Cl.
*F03B 13/18* (2006.01)
*F03B 13/20* (2006.01)
(Continued)

(52) U.S. Cl.
CPC .......... *F03B 13/1815* (2013.01); *F03B 13/14* (2013.01); *F03B 13/16* (2013.01);
(Continued)

(58) Field of Classification Search
CPC ......... Y02E 10/30; Y02E 10/38; F03B 13/14; F03B 13/16; F03B 13/20; F03B 13/22;
(Continued)

(56) References Cited

U.S. PATENT DOCUMENTS

| 260,016 A | 6/1882 | Franklin |
| 344,813 A | 7/1886 | Bull |
| (Continued) | | |

FOREIGN PATENT DOCUMENTS

| CA | 1193490 | 9/1985 |
| CN | 201620995 | 11/2010 |
| (Continued) | | |

OTHER PUBLICATIONS

Supplementary European Search Report for corresponding European Patent Application No. EP16765580 dated Jul. 18, 2018.
(Continued)

*Primary Examiner* — Peter J Bertheaud
(74) *Attorney, Agent, or Firm* — Caesar Rivise, PC (57) ABSTRACT

A hinge system and method for an Articulated Wave Energy Conversion System (AWECS) that provides for hinge and piston pump displacements due to multi-axis forces in allowing adjacent barges of the AWECS to pivot with respect to one another due to wave motion. The hinge system uses a plurality of parallel hinges, and axle segments, coupled between adjacent barges wherein the hinges are coupled to upright trusses positioned transversely along facing edges of each barge. Hinge bracing includes lower V-shaped struts that act as lower stops when the barges pitch up and also include upper struts that act as upper stops when the barges pitch down. The pumps are positioned in parallel. The pumps have special couplings such as ball joint couplings that permit motions other than longitudinal pump/ram motions due to multi-axis forces generated by the wave motion and thus provide omni-directional stress relief to the pumps.

21 Claims, 11 Drawing Sheets

Related U.S. Application Data (60) Provisional application No. 62/133,543, filed on Mar. 16, 2015.

(51) Int. Cl.
*F03B 13/14* (2006.01)
*F03B 13/16* (2006.01)
*F16C 11/06* (2006.01)
*E02B 9/08* (2006.01)

(52) U.S. Cl.
CPC .......... *F03B 13/20* (2013.01); *F16C 11/0614* (2013.01); *E02B 9/08* (2013.01); *F05B 2260/406* (2013.01); *Y02E 10/30* (2013.01); *Y02E 10/38* (2013.01)

(58) Field of Classification Search
CPC .... F03B 13/24; F03B 13/181; F03B 13/1805; F03B 13/1815
See application file for complete search history.

(56) References Cited

U.S. PATENT DOCUMENTS

| | | | |
|---|---|---|---|
| 1,078,323 A | 11/1913 | Trull | |
| 1,636,447 A | 7/1927 | Standish | |
| 2,731,799 A | 1/1956 | Lange et al. | |
| 3,022,632 A | 2/1962 | Parks | |
| 3,191,202 A | 6/1965 | Handler | |
| 3,376,588 A | 4/1968 | Berteaux | |
| 3,628,334 A | 12/1971 | Coleman | |
| 3,755,836 A | 9/1973 | Milazzo | |
| 3,818,523 A | 6/1974 | Stillman, Jr. | |
| 3,846,990 A | 11/1974 | Bowley | |
| 3,848,419 A | 11/1974 | Bowley | |
| 4,004,308 A | 1/1977 | Gongwer | |
| 4,048,802 A | 9/1977 | Bowley | |
| 4,077,213 A | 3/1978 | Hagen | |
| 4,098,084 A | 7/1978 | Cockerell | |
| 4,118,932 A | 10/1978 | Sivill | |
| 4,209,283 A | 6/1980 | Marbury | |
| 4,210,821 A * | 7/1980 | Cockerell | F03B 13/20 290/53 |
| 4,255,066 A | 3/1981 | Mehlum | |
| 4,264,233 A | 4/1981 | McCambridge | |
| 4,280,238 A | 7/1981 | van Heijst | |
| 4,326,840 A | 4/1982 | Hicks et al. | |
| 4,335,576 A | 6/1982 | Hopfe | |
| RE31,111 E | 12/1982 | Hagen | |
| 4,408,454 A | 10/1983 | Hagen et al. | |
| 4,421,461 A | 12/1983 | Hicks et al. | |
| 4,512,886 A | 4/1985 | Hicks et al. | |
| 4,686,377 A | 8/1987 | Gargos | |
| 4,698,969 A | 10/1987 | Raichlen et al. | |
| 4,781,023 A | 11/1988 | Gordon | |
| 4,894,873 A | 1/1990 | Kiefer et al. | |
| 4,954,110 A | 9/1990 | Warnan | |
| 5,112,483 A | 5/1992 | Cluff | |
| 5,132,550 A | 7/1992 | McCabe | |
| 5,186,822 A | 2/1993 | Tzong et al. | |
| 5,359,229 A | 10/1994 | Youngblood | |
| 5,558,459 A | 9/1996 | Odenbach et al. | |
| 5,879,105 A | 3/1999 | Bishop et al. | |
| 6,406,221 B1 | 6/2002 | Collier | |
| 6,451,204 B1 | 9/2002 | Anderson | |
| 6,476,511 B1 * | 11/2002 | Yemm | F03B 13/20 290/42 |
| 6,647,716 B2 | 11/2003 | Boyd | |
| 6,863,806 B2 | 3/2005 | Stark et al. | |
| 7,023,104 B2 | 4/2006 | Kobashikawa | |
| 7,042,112 B2 | 5/2006 | Wood | |
| 7,245,041 B1 | 7/2007 | Olson | |
| 7,264,420 B2 | 9/2007 | Chang | |
| 7,443,045 B2 * | 10/2008 | Yemm | F03B 13/20 290/42 |
| 7,443,047 B2 | 10/2008 | Ottersen | |
| 7,579,704 B2 | 8/2009 | Steenstrup et al. | |
| 7,658,843 B2 | 2/2010 | Krock et al. | |
| 7,694,513 B2 | 4/2010 | Steenstrup et al. | |
| 7,728,453 B2 | 6/2010 | Evans | |
| 7,900,571 B2 | 3/2011 | Jaber et al. | |
| 8,564,151 B1 | 10/2013 | Huebner | |
| 8,650,869 B1 | 2/2014 | McCormick | |
| 8,778,176 B2 | 7/2014 | Murtha et al. | |
| 8,784,653 B2 | 7/2014 | Murtha et al. | |
| 8,866,321 B2 | 10/2014 | McCormick et al. | |
| 9,018,779 B2 * | 4/2015 | Yemm | F03B 13/20 290/42 |
| 9,435,317 B2 | 9/2016 | Cunningham et al. | |
| 9,702,334 B2 * | 7/2017 | Murtha, Jr. | F03B 13/20 |
| 2003/0010691 A1 | 1/2003 | Broussard | |
| 2003/0121408 A1 | 7/2003 | Linerode et al. | |
| 2006/0112871 A1 | 6/2006 | Dyhrberg | |
| 2006/0283802 A1 | 12/2006 | Gordon | |
| 2007/0108112 A1 | 5/2007 | Jones | |
| 2007/0200353 A1 | 8/2007 | Ottersen | |
| 2009/0084296 A1 | 4/2009 | McCormick | |
| 2010/0054961 A1 | 3/2010 | Palecek et al. | |
| 2010/0320759 A1 | 12/2010 | Lightfoot et al. | |
| 2011/0089689 A1 | 4/2011 | Gregory | |
| 2011/0121572 A1 | 5/2011 | Levchets et al. | |
| 2011/0299927 A1 | 12/2011 | McCormick et al. | |
| 2011/0304144 A1 | 12/2011 | Dehlsen et al. | |
| 2012/0025532 A1 | 2/2012 | Song | |
| 2012/0067820 A1 | 3/2012 | Henthorne et al. | |
| 2013/0008158 A1 | 1/2013 | Hon | |
| 2013/0008164 A1 | 1/2013 | Cunningham et al. | |

FOREIGN PATENT DOCUMENTS

| | | |
|---|---|---|
| DE | 2248260 | 4/1974 |
| FR | 2437507 | 4/1980 |
| GB | 2113311 | 8/1983 |
| GB | 2459112 | 10/2009 |
| JP | 2002142498 | 5/2002 |
| KR | 20110020077 | 3/2011 |
| WO | WO 95/10706 | 4/1995 |
| WO | WO 01/96738 | 12/2001 |
| WO | WO 03/026954 | 4/2003 |
| WO | WO 2011/061546 | 5/2011 |

OTHER PUBLICATIONS

Bernitsas, et al., "VIVANCE (Vortex Induced Vibration for Aquatic Clean Energy): A New Concept in Generation of Clean and Renewable Energy from Fluid Flow," Proceedings of OMAE2006, Paper OMAE06-92645, Hamburg, Germany Jun. 4-9, 2006, pp. 1-18.

Blevins, Robert D., "Flow-Induced Vibrations," Van Nostrand Reinhold, New York, 1990, pp. 194-213.

Budar, et al., "A Resonant Point Absorber of Ocean-Wave Power," Nature, vol. 256, Aug. 1975, pp. 478-480.

Cébron, et al., "Vortex-Induced Vibrations Using Wake Oscillator Model Comparison on 2D Response with Experiments," Institute of Thermomechanics, Prague, 2008.

Falnes, Johannes, "Ocean Waves Oscillating Systems," Cambridge University Press, pp. 196-224, 2002.

Farshidianfar, et al., "The Lock-in Phenomenon in VIV Using a Modified Wake Oscillator Model for Both High and Low Mass-Damping Ratio," Iranian Journal of Mechanical Engineering, vol. 10, No. 2, Sep. 2009.

Garnaud, et al, "Comparison of Wave Power Extraction by a Compact Array of Small Buoys and by a Large Buoy," Proceedings of the 8th European Wave and Tidal Energy Conference, Uppsala, Sweden, 2009, pp. 934-942.

Jauvitis, et al.' The Effect of Two Degrees of Freedom on Vortex-Induced Vibration at Low Mass and Damping,: J. Fluid Mechanics, vol. 509, 2004, pp. 23-62.

Lee, et al., "On the Floating Breakwater-A New Arrangement," Proceedings, International Conf. on Coastal Engineering, Taipei, 1986, pp. 2017-2022.

(56) References Cited

OTHER PUBLICATIONS

Leong, et al., "Two-Degree-of-Freedom Vortex-Induced Vibration of a Pivoted Cylinder Below Critical Mass Ratio," Proceedings of the Royal Society A, vol. 464, 2008, pp. 2907-2927.
Liang et al., "A Study of Spar Buoy Floating Breakwater," Ocean Engineering, vol. 31, 2004, pp. 43-60.
McCormick, et al., "Full-Scale Experimental Study of Bi-Modal Buoy," Report EW 01-11, Department of Naval Architecture and Ocean Engineering, U.S. Naval Academy, Jun. 2011, 32 pages.
McCormick, et al., "Planing Characteristics of Fast-Water Buoys," Journal of the Waterways Harbors and Coastal and Engineering Division, vol. 99, No. WW4, Nov. 1973, pp. 485-493.
McCormick, et al., "Prototype Study of a Passive Wave-Energy Attenuating Bi-Modal Buoy," Murtech, Inc. Report M-12-1, Jan. 2012, 26 pages.
Miles, John W., "On the Interference Factors for Finned Bodies," J. Aeronautical Sciences, vol. 19, No. 4, Apr. 1952, p. 287.
Murali, et al., "Performance of Cage Floating Breakwater," Journal of Waterway, Port, Costal and Ocean Engineering, Jul./Aug. 1997, pp. 1-8.
Ng, et al., "An Examination of Wake Oscillator Models for Vortex-Induced Vibrations," Naval Undersea Warfare Center Division, Newport, RI, Technical Report 11,298, Aug. 1, 2011, 18 pages.
Ogink, et al., "A Wake Oscillator With Frequency Dependent Coupling for the Modeling of Vortex-Induced Vibration," Journal of Sound and Vibration, No. 329, 2010, pp. 5452-5473.
Rodenbusch, George, "Response of a Pendulum Spar to 2-Dimensional Random Waves and a Uniform Current," Massachusetts Institute of Technology and Woods Hole Oceanographic Institution, Engineering Program, Ph.D. Dissertation, Aug. 1978, 138 pages.
Ryan, et. al., "Energy Transfer in a Vortex Induced Vibrating Tethered Cylinder System", Conf. on Bluff Body Wakes and Vortex-Induced Vibrations, Port Douglas, Australia, Dec. 2002, 4 pages.
Shiguemoto, et al., "Vortex Induced Motions of Subsurface Buoy with a Vertical Riser: A Comparison Between Two Phenomenological Models" Proceedings, 23° Congresso Nacional de Transporte Aquaviário, Construção Naval e Offshore, Rio de Janeiro, Oct. 25-29, 2010, pp. 1-9.
Sobey, et al., "Hydrodynamic of Circular Piles," Proceedings, 6th Australian Hydraulics and Fluid Mechanics Conference, Adelaide, Dec. 1977, pp. 253-256.
Long Beach Water Department, Under-Ocean Floor Seawater intake and Discharge Test Plan, Apr. 1, 2009.
Lovo, Robert, "Initial Evaluation of the Subfloor Water Intake Structure System (SWISS) vs. Conventional Multimedia Pretreatment Techniques," Assistance Agreement No. 98-FC-81/0044, Desalination Research and Development Program Report No. 66, US. Dept. of Interior, May 2001.
McCormick, "Ocean Wave Energy Conversion," Wiley-Interscience, New York (1981, reprinted by Dover Publication, Long Island, New York in 2007).
WateReuse Association, "Overview of Desalination Plan Intake Alternatives", Mar. 2011.
International Search Report for related PCT Application No. PCT/US2013/059175 dated Mar. 19, 2014.
International Search Report for related PCT Application No. PCT/US2013/048906 dated Sep. 30, 2013.
International Search Report for corresponding PCT Application No. PCT/US2014/056243 dated Dec. 15, 2014.
International Seach Report for corresponding PCT Application No. PCT/US2016/022438 dated Jun. 21, 2016.

* cited by examiner

HINGE SYSTEM FOR AN ARTICULATED WAVE ENERGY CONVERSION SYSTEM

CROSS-REFERENCE TO RELATED APPLICATIONS

This bypass continuation application claims priority under 35 U.S.C. § 120 of International Application PCT/US2016/022438 filed on Mar. 15, 2016 which in turn claims the benefit under 35 U.S.C. § 119(e) of U.S. Ser. No. 62/133,543 filed on Mar. 16, 2015 and all of which are entitled HINGE SYSTEM FOR AN ARTICULATED WAVE ENERGY CONVERSION SYSTEM, and all of whose entire disclosures are incorporated by reference herein.

BACKGROUND OF THE INVENTION

The present invention relates in general to wave energy conversion systems and, more particularly, to a hinge system that allows for articulation of coupled floating elements while surviving multi-axis forces.

Richard Peter McCabe devised the McCabe Wave Pump, which is described in U.S. Pat. No. 5,132,550. The McCabe Wave Pump consists of three rectangular steel pontoons, which move relative to each other in the waves. A damper wave plate attached to the central pontoon ensures that it remains stationary as the fore and aft pontoons move relative to the central pontoon by pitching about the hinges. Energy is extracted from the rotation about the hinge points by linear hydraulic pumps mounted between the central and other two pontoons near the hinges.

Figure 1:
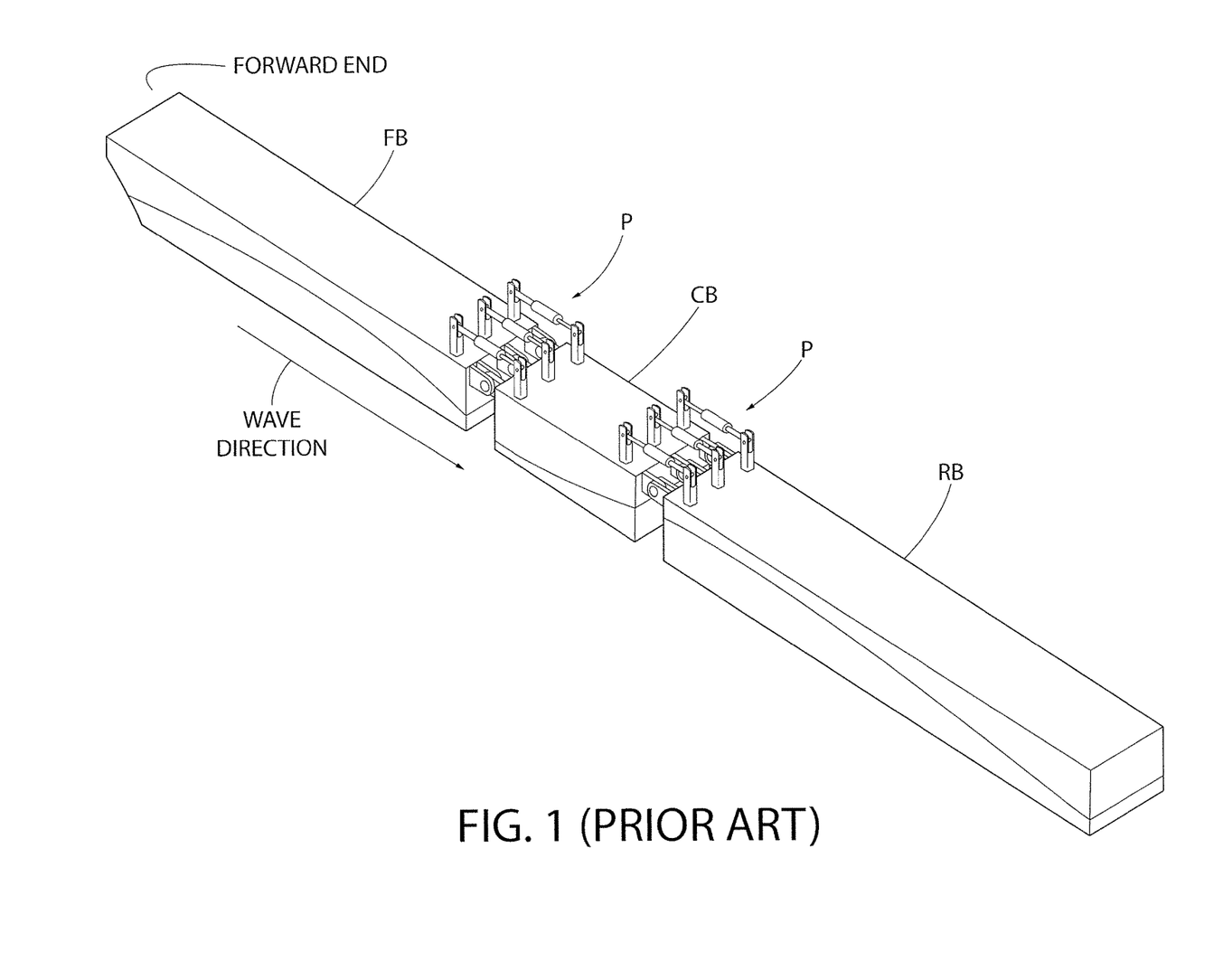
FIG. 1 is an isometric view of a prior art articulate barge wave-energy converter system (AWECS)

A related configuration to the McCabe Wave Pump is an "articulated wave energy conversion system (AWECS)" which is disclosed in U.S. Pat. No. 8,778,176 (Murtha, et al.); U.S. Pat. No. 8,784,653 (Murtha, et al.); and U.S. Pat. No. 8,866,321 (McCormick, et al.), and all of which are owned by the same Assignee as the present application, namely, Murtech, Inc. of Glen Burnie, Md. See also U.S. Pat. No. 8,650,869 (McCormick). As shown in FIG. 1, an AWECS uses a plurality of pneumatic or hydraulic pumps P (hereinafter, "hydraulic" is used, it being understood that "pneumatic" is also interchangeable with "hydraulic") that straddle the two articulating barges, a forward barge FB and a rear (also referred to as "aft") barge RB which are coupled together, e.g. by hinges. A damper wave plate (DWP) attached to a central barge CB ensures that it remains stationary as the fore FB and aft RB barges move relative to the central barge CB by pitching about the hinges. As an incoming wave makes contact with the forward barge FB first, the hydraulic fluid in the pumps coupled between the forward barge FB and the center barge CB are driven in a first direction; as the wave continues, the hydraulic fluid in the pumps P coupled between the rear barge RB and the center barge CB are driven in a second opposite direction. The end results are bi-directional hydraulic pumps P. The output of these hydraulic pumps P are used for water desalination or energy conversion.

However, the articulation of the fore and aft barges FB/RB with respect to the center barge CB are not simply hinged upward and downward movement; rather, there is significant motion in the orthogonal axes that results in the need for providing multi-axis motion at the hinges during the AWECS life cycle.

All references cited herein are incorporated herein by reference in their entireties.

BRIEF SUMMARY OF THE INVENTION

A hinge system that provides omni-directional stress relief to at least one piston pump (e.g., a linear piston pump) positioned across a gap between at least two floating members (e.g., barges) that are hinged together is disclosed. The at least two floating members pivot about an axis perpendicular to a common longitudinal axis of the at least two floating members and the piston pump is positioned across the gap and aligned with the longitudinal axis. The hinge system comprises: a bracing structure having a first portion that is fixedly coupled to a first floating member and a second portion that is fixedly coupled to a second floating member, and wherein the first portion and the second portion are hingedly coupled to each other using a plurality of non-connected axle segments to permit the first floating member to pivot with respect to the second floating member due to wave motion; and a first truss (e.g., a Warren Truss) positioned transversely along a first end of the first floating member and to which the first portion is fixedly coupled and a second truss (e.g., a Warren Truss) positioned transversely along a first end of the second floating member, opposite to the first end of the first floating member, and to which said second portion is fixedly coupled, the first and second trusses comprising at least one set of corresponding universal couplings (e.g., ball joints, etc.) between which the piston pump is coupled, thereby providing omni-directional stress relief to the piston pump by allowing movement of the piston pump in directions other than the longitudinal axis due to multi-axis forces imposed by the wave motion on the first and second floating members.

A method of providing omni-directional stress relief to at least piston pump (e.g., a linear piston pump) positioned across a gap between at least two floating members (e.g., barges) that are hinged together is disclosed. The piston pump is operable when wave motion causes the at least two floating members to pivot. The method comprises: securing a first portion of a bracing structure to one end of a first floating member and securing a second portion of the bracing structure to one end of a second floating member that faces the first floating member; pivotally coupling the first and second portions together using a plurality of non-connected axle segments such that the first and second floating members can pivot about an axis perpendicular to a common longitudinal axis of the first and second floating members; providing a universal coupling member on a respective truss (e.g., a Warren Truss) to which the first and second portions are coupled; and connecting the ends of the at least one piston pump to respective universal coupling members (e.g., ball joints, etc.) positioned on respective trusses such that the pump is positioned across the gap, and wherein the universal coupling members provide omni-directional stress relief to the pump by allowing movement of the pump in directions other than the longitudinal axis due to multi-axis forces imposed by the wave motion on the first and second floating members.

A hinge system that provides omni-directional stress relief to at least two piston pumps (e.g., linear piston pumps) positioned in parallel position above the other and both positioned across a gap between at least two floating members (e.g., barges) that are hinged together is disclosed. The at least two floating members pivot about an axis perpendicular to a common longitudinal axis of the at least two floating members and said piston pump positioned across the gap, aligned with the longitudinal axis. The hinge system comprises: a bracing structure having a first portion that is fixedly coupled to a first floating member and a second portion that is fixedly coupled to a second floating member, and wherein the first portion and the second portion are hingedly coupled to each other using a plurality of non-connected axle segments to permit the first floating member to pivot with respect to the second floating member due to wave motion; a first truss (e.g., a Warren Truss) positioned transversely along a first end of the first floating member and to which the first portion is fixedly coupled and a second truss (e.g., a Warren Truss) positioned transversely along a first end of the second floating member, opposite to the first end of the first floating member, and to which the second portion is fixedly coupled, the first and second trusses comprises at least one set of corresponding universal couplings (e.g., ball joints, etc.) between which a first one of the piston pumps is coupled, thereby providing omni-directional stress relief to the first one of the two piston pumps by allowing movement of the first one of the two piston pumps in directions other than the longitudinal axis due to multi-axis forces imposed by the wave motion on said first and second floating members; and respective angled struts that couple between each of the trusses and respective base members of the first and second portions, the base members being hingedly coupled via the plurality of non-connected axle segments, and wherein the respective angled struts form aligned pairs across the gap and each aligned angled strut comprises a corresponding universal coupling and between which the second one of the two piston pumps is coupled so that the first and second piston pumps are positioned one over the other, and thereby providing omni-directional stress relief to the second one of the two piston pumps by allowing movement of the second one of the two piston pumps in directions other than the longitudinal axis due to multi-axis forces imposed by the wave motion on the first and second floating members.

A method of providing omni-directional stress relief to two piston pumps positioned in parallel position above the other and both positioned across a gap between at least two floating members that are hinged together is disclosed. The piston pumps are operable when wave motion causes the at least two floating members to pivot. The method comprises: securing a first portion of a bracing structure to one end of a first floating member and securing a second portion of the bracing structure to one end of a second floating member that faces the first floating member; pivotally coupling the first and second portions together using a plurality of non-connected axle segments such that the first and second floating members can pivot about an axis perpendicular to a common longitudinal axis of the first and second floating members; providing a universal coupling member (e.g., a ball joint, etc.) on a respective truss to which the first and second portions are coupled; connecting the ends of a first one of the two piston pumps to respective universal coupling members positioned on respective trusses such that the first one of the two piston pumps is positioned across the gap, the universal coupling members providing omni-directional stress relief to the pump by allowing movement of the first one of the two piston pumps in directions other than the longitudinal axis due to multi-axis forces imposed by the wave motion on the first and second floating members; coupling respective angled struts between each of the trusses and respective base members of the first and second portions and wherein the base members are hingedly coupled via the plurality of non-connected axle segments, and wherein the respective angled struts form aligned pairs across the gap; providing a corresponding universal coupling on each angled strut that forms an aligned pair; coupling the second one of the two piston pumps between the universal couplings of the aligned pair so that the first and second piston pumps are positioned one over the other, and wherein the universal couplings to which the second one of the two piston pumps is coupled providing omni-directional stress relief to the second one of the two piston pumps by allowing movement of the second one of the two piston pumps in directions other than the longitudinal axis due to multi-axis forces imposed by the wave motion on the first and second floating members.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

In order to utilize the energy traveling as a water wave, whether fresh, salt or brackish, the technique that is used to convert the energy into usable work, must be capable of surviving multi axis forces during its life cycle. One of the key aspects of the present invention, as will be discussed below, is the omni-directional stress relief that is provided by the hinge system disclosed herein. This hinge system allows the pivoting of one barge with respect to another barge due to wave motion while allowing movement in other directions due to multi-axis forces.

As mentioned previously, the Articulated Wave Energy Conversion System (AWECS), is an articulated barge configuration where there are three barges, connected two separate hinge systems. The hinges allow the connected barges to articulate. The hinge system attaches the barges and also attaches the piston pumps P (e.g., linear piston pumps) that are used to pressurize the water in order to process the stream through reverse osmosis membranes. Ideally, wave motion causes the barges to articulate and thereby cause the piston pumps to extend/retract their pistons accordingly; however, because the barges experience significant wave motion in the orthogonal axes, such consequent barge motion can bind, impede and even damage the pumps. Thus, the key to the present invention is providing omni-directional strain relief to these pumps that span the gap between the barges to eliminate or minimize these consequences of these multi-axis forces.

Figure 2:
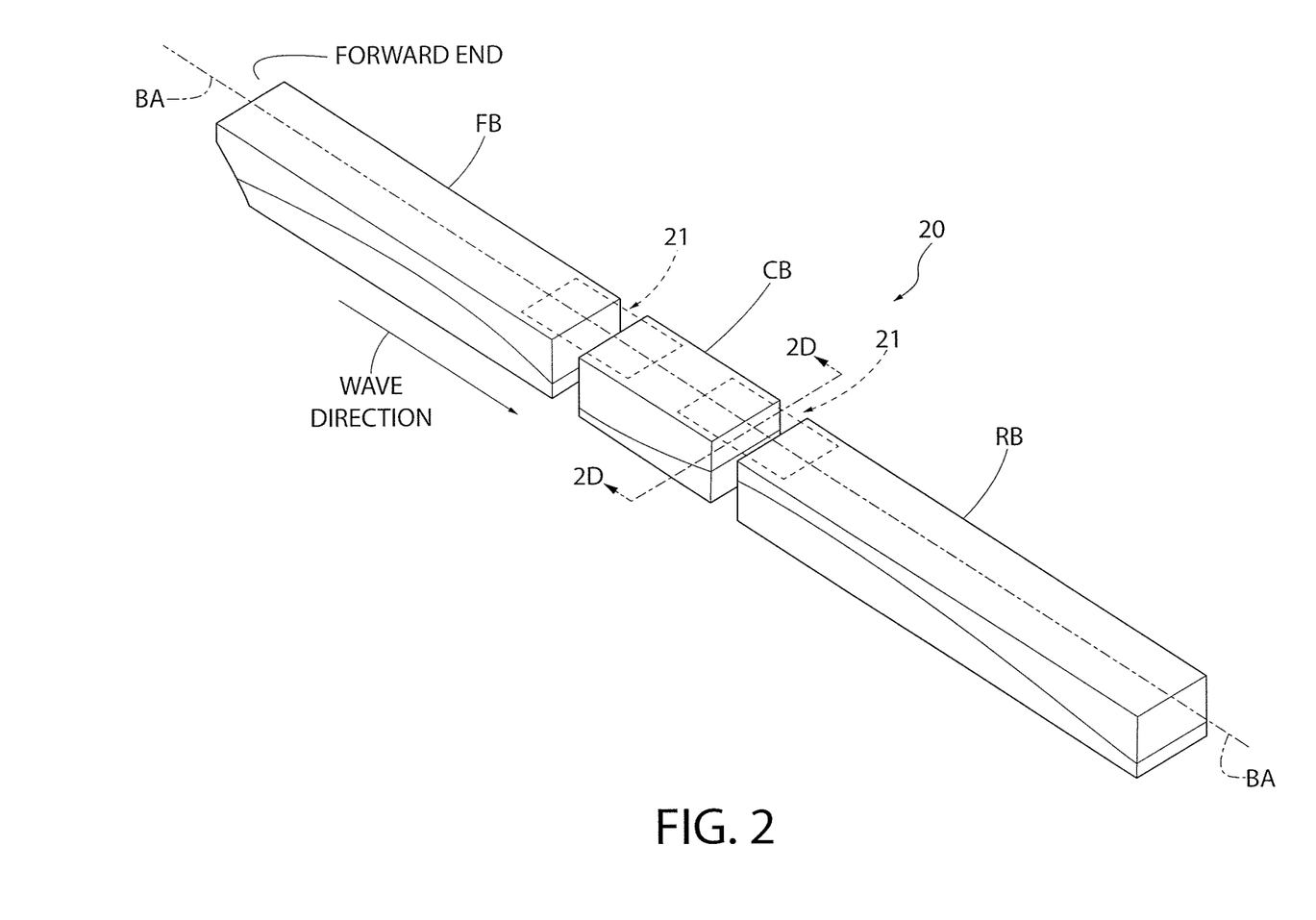
FIG. 2 is an isometric view of the AWECS using the hinge system and method of the present invention showing the location of the hinge system and method in phantom.
Figure 2A:
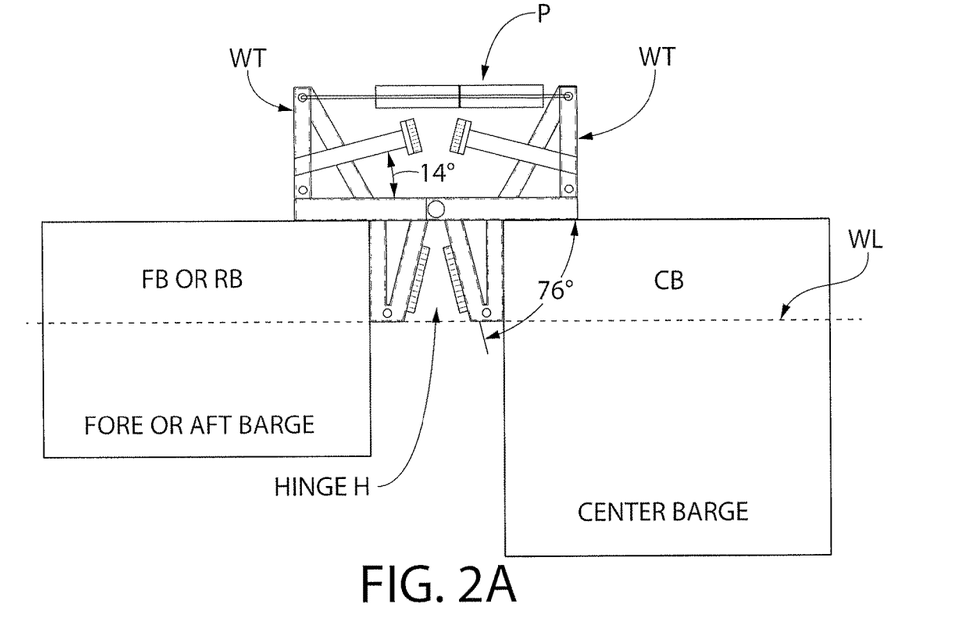
FIG. 2A is a functional view of the hinge system of the present invention shown in its equilibrium condition.
Figure 2B:
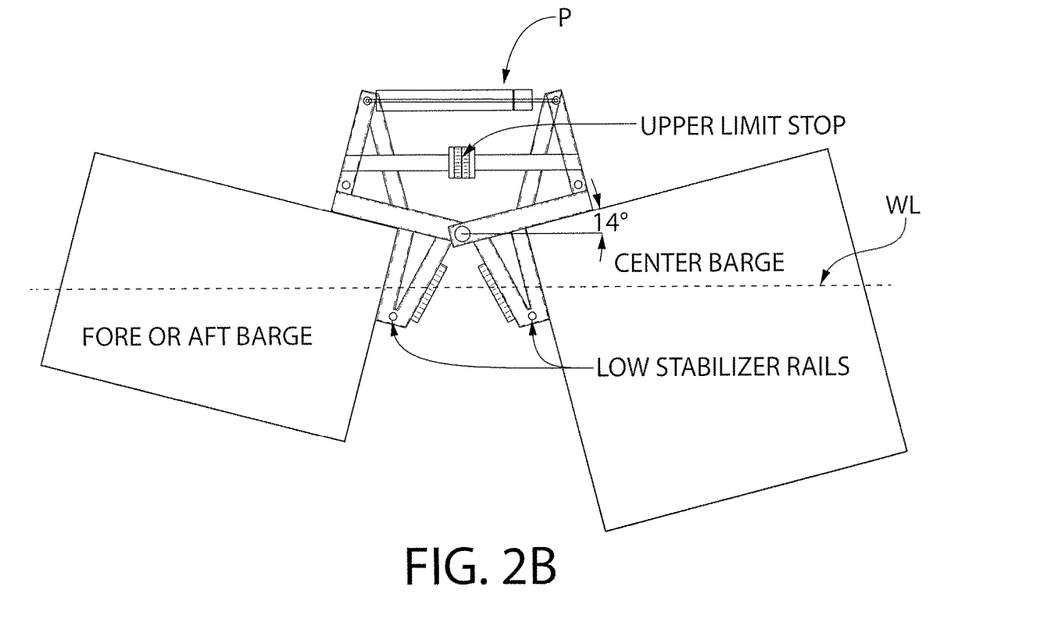
FIG. 2B is a functional view of the hinge system of the present invention shown in its full extension downward position.
Figure 2C:
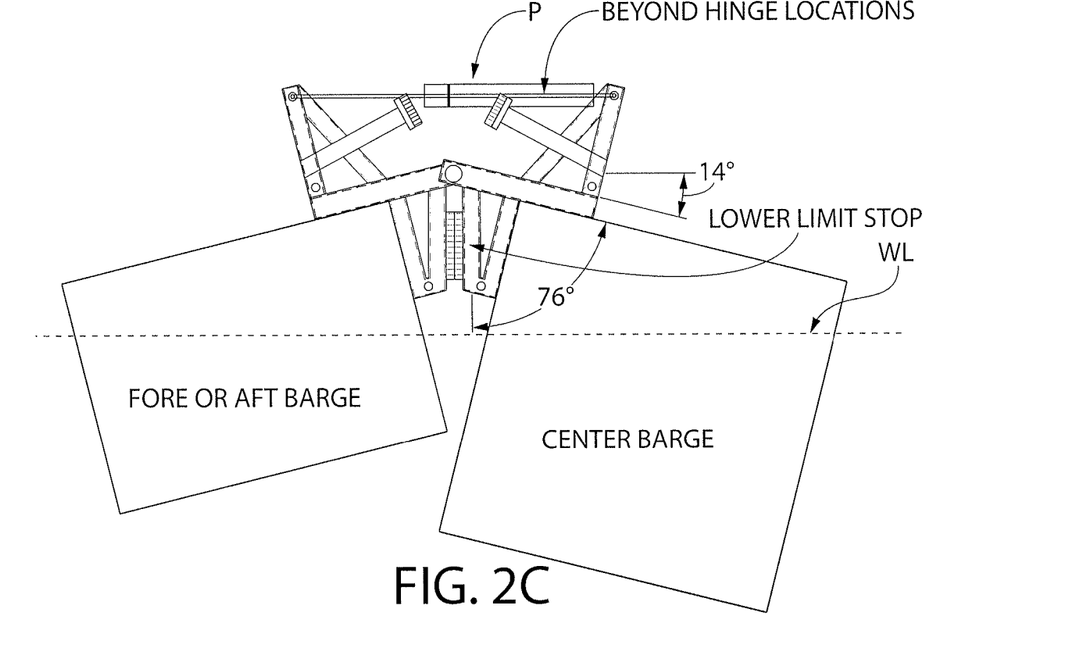
FIG. 2C is a functional view of the hinge system of the present invention shown in its full extension upward position.
Figure 2D:
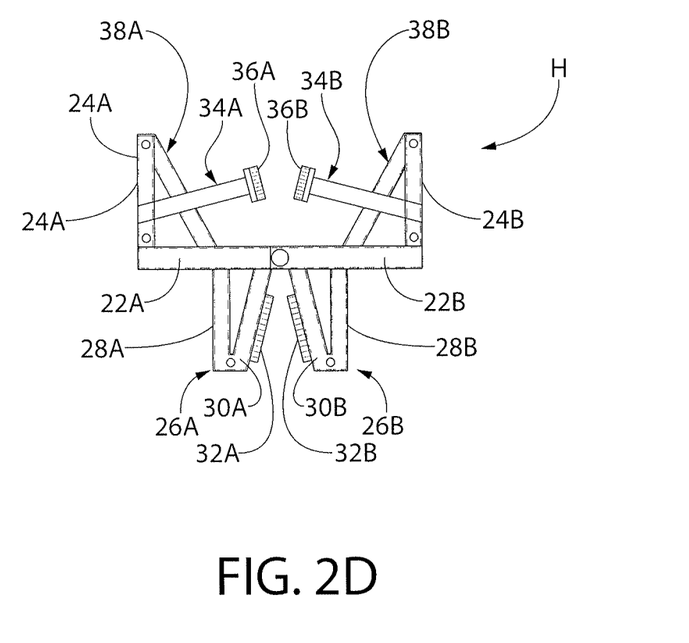
FIG. 2D is a functional side view of a portion of the hinge system bracing.
Figure 2E:
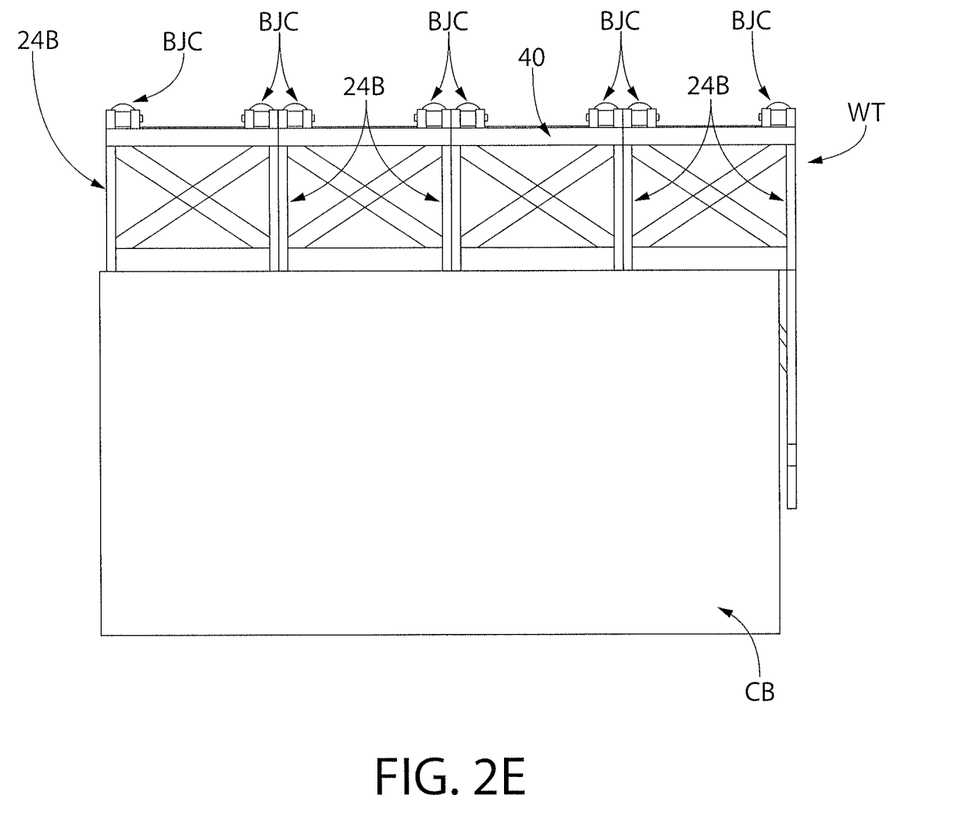
FIG. 2E is an end view of the center barge taken along line 2D-2D of FIG. 2 and depicting an exemplary Warren Truss that is positioned transversely along an edge of the center barge.
Figure 2F:
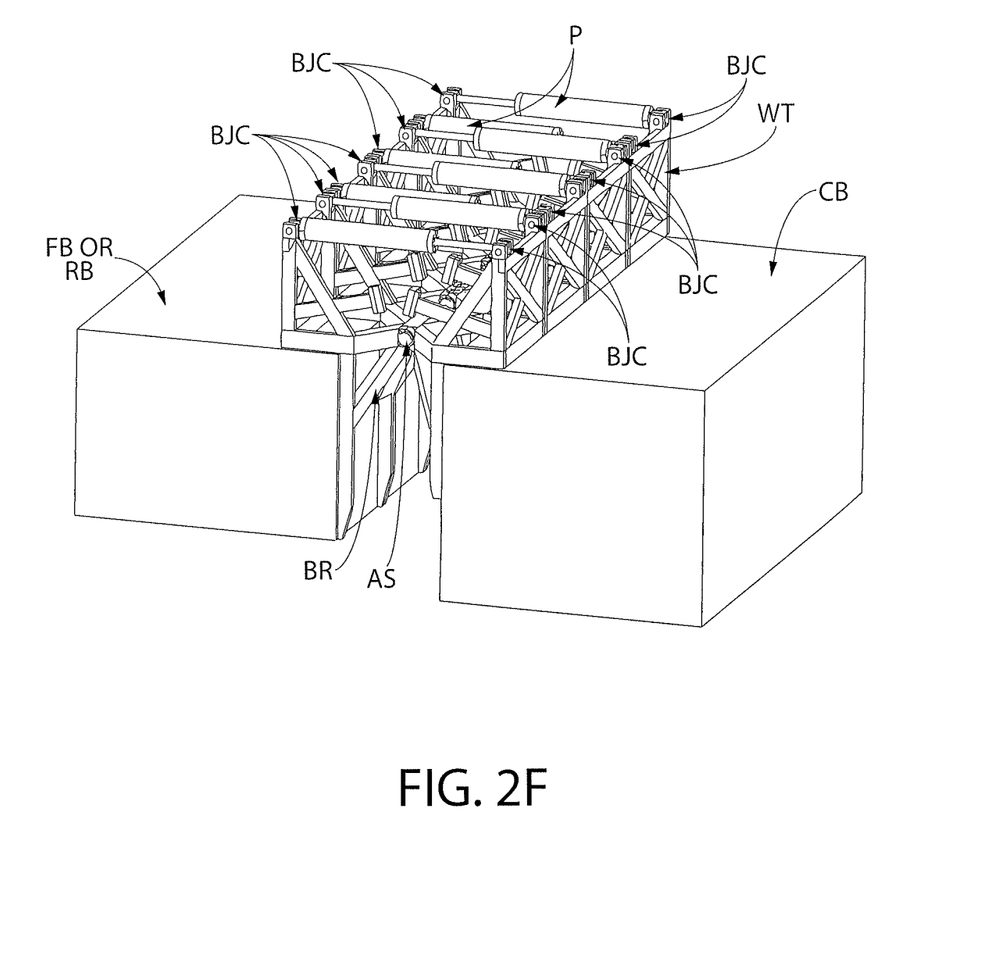
FIG. 2F is a partial isometric view of the hinge system installed between the center barge and either the front barge or the rear barge, while omitting the lower rub rails.
Figure 2G:
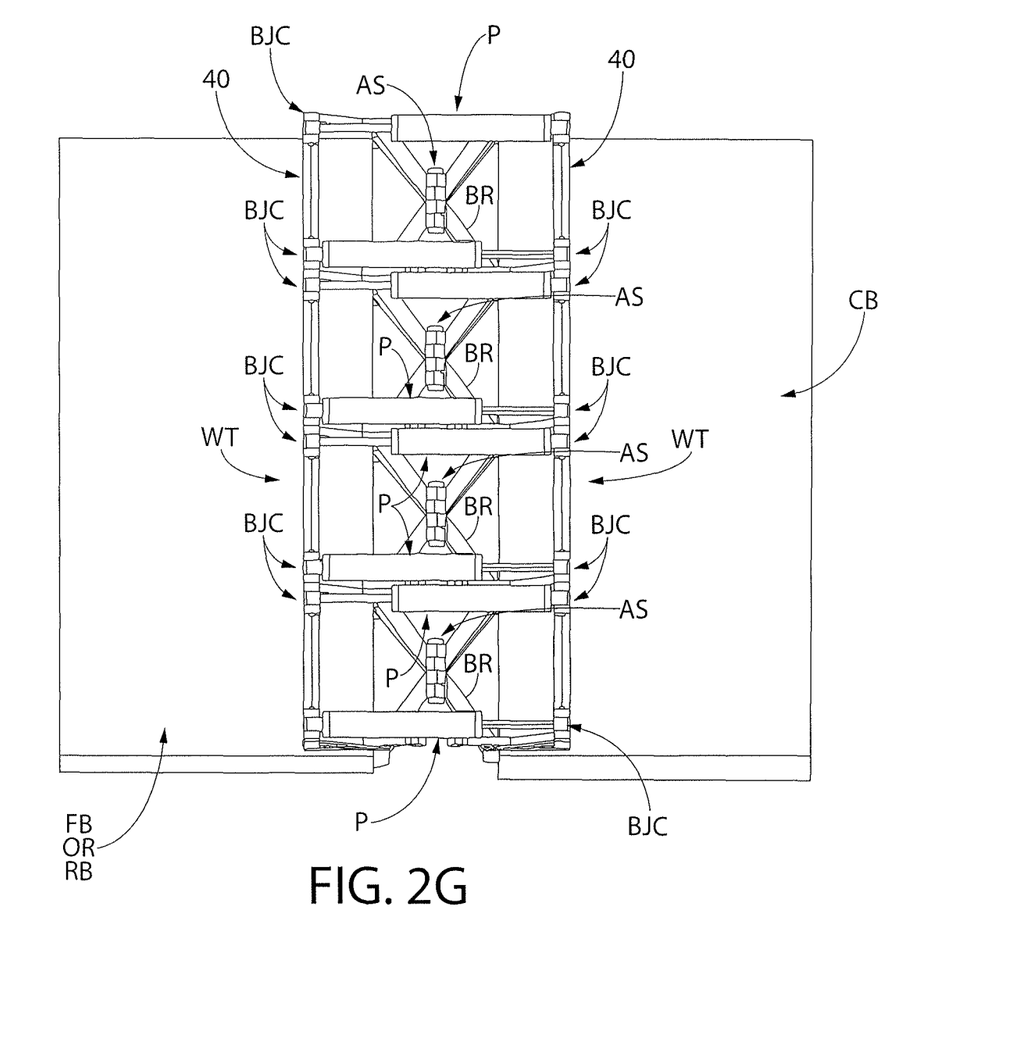
FIG. 2G is a partial top view of the hinge system of FIG. 2F installed between the center barge and either the front barge or rear barge and also depicting an exemplary eight pump configuration.

FIG. 2 depicts the AWECS and the location 21 of the hinge system/method 20 of the present invention (see also FIG. 2F). In particular, as shown in FIGS. 2A-2I, the center barge unit CB is coupled to both the fore barge unit FB and the aft barge unit RB by moveable parallel hinges H designed to rotate along an axis perpendicular to the main longitudinal axis BA of the barges. FIG. 2A shows the equilibrium position of the hinges H, FIG. 2B shows the full extension downward position of the hinges H, and FIG. 2C shows the full extension upward position of the hinges H. FIG. 2G is a partial isometric view showing an exemplary configuration of eight piston pumps P coupled through the hinge system between the center barge CB and the fore barge FB, or to the aft barge RB.

Figure 2H:
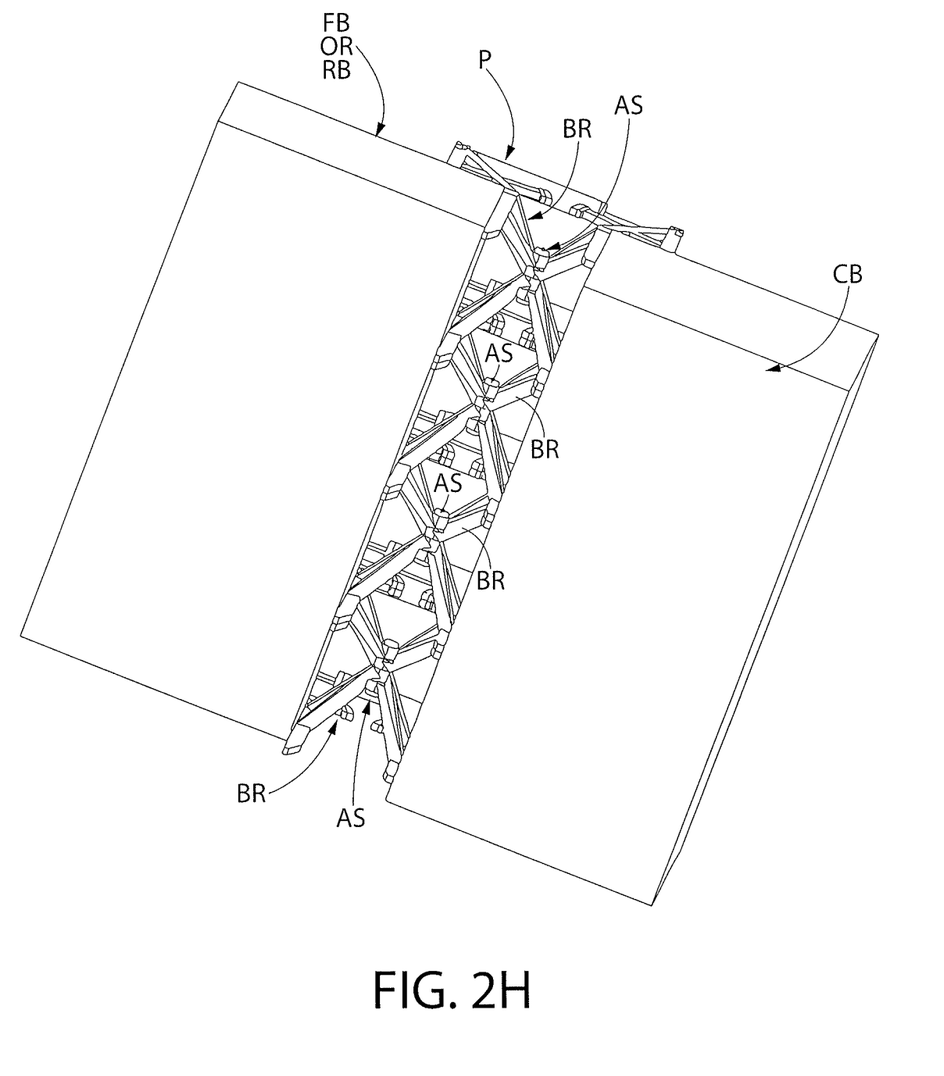
FIG. 2H is a partial bottom view of the hinge system of FIG. 2F.
Figure 2I:
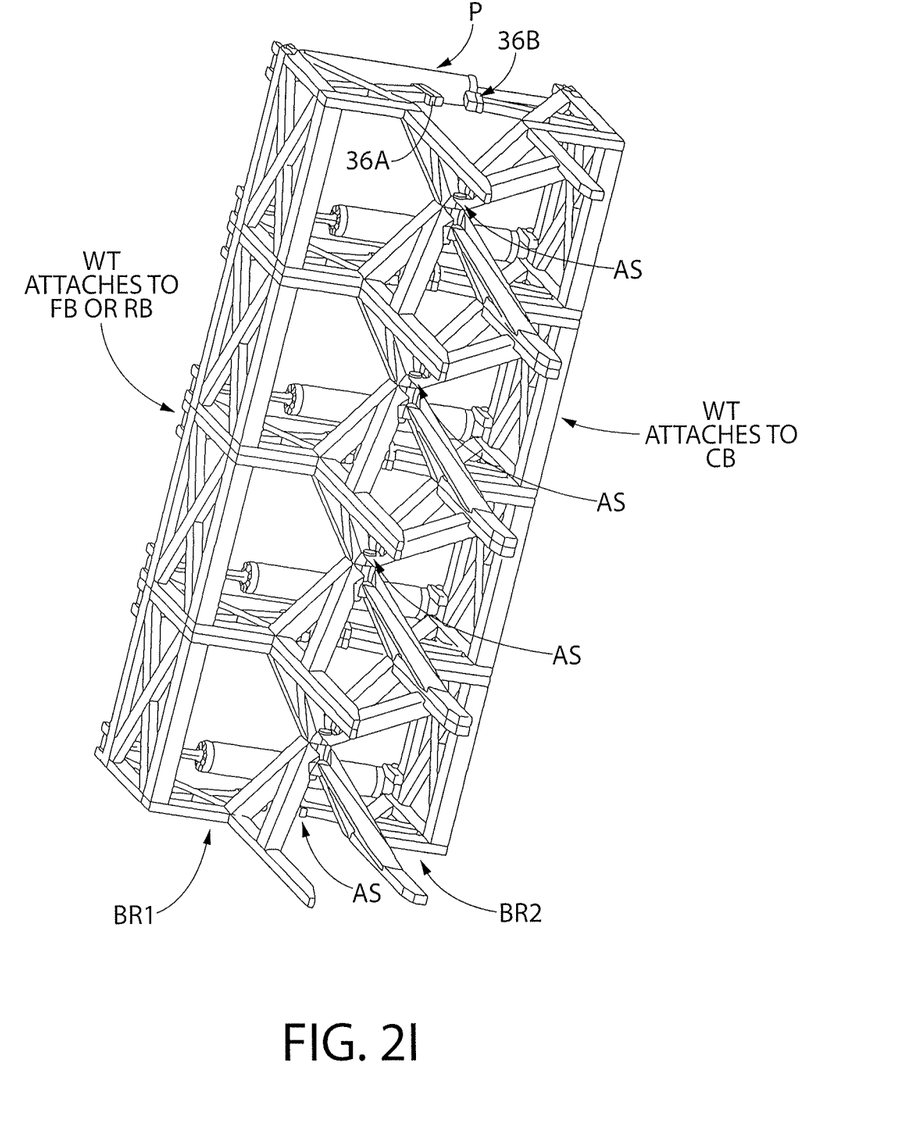
FIG. 2I an isometric bottom view of the hinge system bracing alone with the center barge omitted and with either the front barge or rear barge also omitted for clarity.

As shown most clearly in FIG. 2I, the hinge system of the present invention comprises a bracing structure BR having a first portion BR1 that couples to a Warren Truss WT secured on one barge and a second portion BR2 that couples to another Warren Truss WT secured on the other facing barge. The bracing structure portions BR1 and BR2 are pivotally coupled to each other using a plurality (e.g., four, by way of example only) of independent axle segments AS. The piston pumps P span the gap between the barges, being coupled to the Warren Trusses, as will be discussed in detail below.

As shown most clearly in FIG. 2D, each hinge H is composed of the bracing structure BR formed of structural steel members that are mechanically attached to the end sections of each respective barge which have been reinforced internally to receive the hinge reactions as they move within the wave climate. Each hinge H comprises two base members 22A/22B that are hingedly coupled together by an axle element AS (see FIGS. 2F-2I). The base members 22A/22B are fixedly- and orthogonally-coupled to respective uprights 24A/24B. Also fixedly coupled to each base member 22A/22B are V-shaped members 26A/26B that cooperate to act as a lower stop during full extension upward of the respective barges (FIG. 2C). Each V-shaped member 26A/26B comprises a barge fixture strut 28A/28B that are fixedly coupled to the facing edges of the respective barges. Each V-shaped member 26A/26B also comprises a respective predetermined-angled stop strut 30A/30B and each of which comprises a respective rub rail (e.g., rubber) 32A/32B that come in contact during lower stop operation. By way of example only, the predetermined angled stop struts 30A/30B form an angle of 76° (FIG. 2A) with respect to the respective base member 22A/22B. Also fixedly coupled to the uprights 24A/24B at a predetermined angle are upper stop struts 34A/34B. At the facing ends of these upper stop struts are rub rails (e.g., rubber) 36A/36B that come into contact during upper stop operation (FIG. 2B). By way of example only, the predetermined angled upper stop struts 34A/34B form an angle of 14° (FIG. 2A) with respect to the respective base member 22A/22B. Also coupled to each upright 24A/24B is a respective load strut 38A/38B that is fixedly coupled to the respective base members 22A/22B.

It should be understood that all of the components (e.g., struts, V-shaped member, etc.) of each hinge mechanism can be formed from discrete components that are fastened together or they may comprise an integrated or unitized structure. Both forms are covered by the broadest scope of the invention.

On each shipboard side of the center barge CB and the facing side of the fore barge FB and the aft barge RB, all of the hinges' H uprights 24A and 24B are connected together in a Warren Truss WT, as shown most clearly in FIG. 2E. In particular, the uprights 24A/24B extend+/−1 meter above the barge deck at the interconnection locations. The hinges H are welded tube steel members that form the Warren Truss WT (FIG. 2E) perpendicular to the central barge axis BA with internal diagonal chords whose panel points are collinear with the reinforced internal frames of each barge at their ends. As such, a Warren Truss WT is positioned transversely along each edge of the fore and aft barges that face a respective edge of the center barge, which includes a corresponding transversely-positioned Warren Truss WT. As shown most clearly in FIG. 2F, a Warren Truss WT is positioned along the top edge of each barge. As a result, for one AWECS (FIG. 2), there are two hinge systems with their own bracing structures BR, i.e., one between the forward barge FB and the center barge CB and another between the rear barge RB and the center barge CB. Warren Trusses WT form the sides of these hinge system bracing structures, each positioned along an edge of a facing barge.

As shown most clearly in FIGS. 2G-2H, the hinge mechanism comprises a plurality of axle segments AS also perpendicular to the central barge axis BA (FIG. 2) positioned at the elevation of the top deck of the barges; these axle segments AS permit the respective bracing assemblies BR1 and BR2 between the opposing Warren Trusses WT to pivot, without physically connecting each bracing assembly BR1 and BR2 using a single common axle. Each Warren Truss WT is fitted out with a circular tube connection bar 40 onto which each transverse pump mechanism P (e.g., FIGS. 2F and 2I) is mounted across the top portion to the mating hinge on the adjoining barge.

Another key aspect of the present invention 20 is the use of a specialized coupling mechanism at each end of each pump P to permit pump P movement in a plurality of directions due to the multi-axis forces, as well as providing for modular maintenance techniques. ThepumpsP are able to be de-coupled such that they ride on the connection bar 40

(also referred to as the "attachment bar") of the Warren Truss WT and do not necessarily need to align with the hinges H. As shown most clearly in FIG. 2G, the pumps P are located between axle segments AS, although that location is only by way of example. As will be discussed below, the piston pump P ends are connected to universal couplings (e.g., ball joints BJ, discussed below) that can be positioned anywhere along the connection bar 40. Furthermore, by way of example only, eight piston pumps P are positioned in parallel orientation in with the central barge axis BA. Adjacent pumps are oriented in opposite directions, also by way of example only, as shown most clearly in FIG. 2G.

Figure 3:
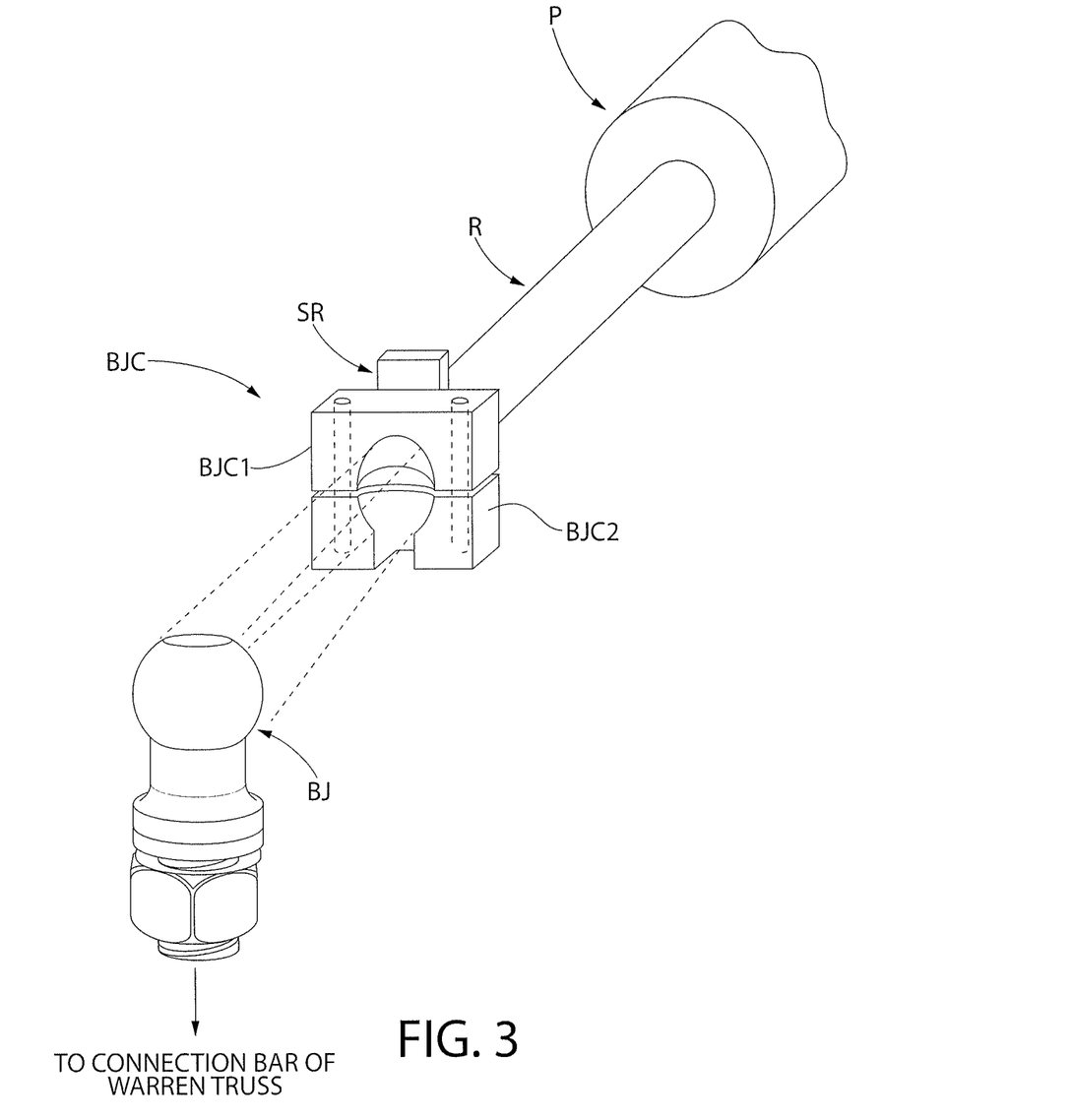
FIG. 3 shows a partial view of the universal coupling that couples the ram end of the hydraulic actuator to a ball joint coupling positioned on the Warren Truss.

By way of example only, and as shown in FIG. 3, these pump ends (i.e., the pump ram end as well as the pump housing support end (the end opposite the ram)) are fabricated to have a ball joint attachment to the Warren Truss T connection bar 40 such that their mounting has movement releases in four of the six degrees of freedom (hence "universal") to uncouple the hinge H movements in lateral torsion as the hinges H move about the axle segments AS along any series of wave conditions. These attachments allow the pumps P to be strategically positioned along the Warren Truss hinge H according to their varying internal pressures to establish motion equilibrium during their operation. FIG. 3 depicts only the coupling at the ram end portion of the pump, it being understood that a similar coupling is available on the other end of the pump P. In particular, FIG. 3 shows one pump whose ram R comprises a ball joint coupling BJC formed of a pair of displaceable ball joint portions (BJC1/BJC2) to permit a corresponding ball joint BJ, that is located on the connection bar 40 of the Warren Truss WT, to be received therein. The ball joint coupling BJC includes a slide rail SR that allows the two portions BJC1 and BJC2 to be adjusted to allow entry and then capture of the ball joint BJ therein. Fasteners F (e.g., bolt and nut, cotter pins, etc.) can be manipulated to unlock/lock the two portions BJC1/BJC2 around the ball joint BJ. FIG. 3A shows an exemplary set of ball joints BJs on the connection rod 40 of one Warren Truss WT, awaiting receipt of the corresponding ball joint connections BJCs of the pumps P.

Figure 4:
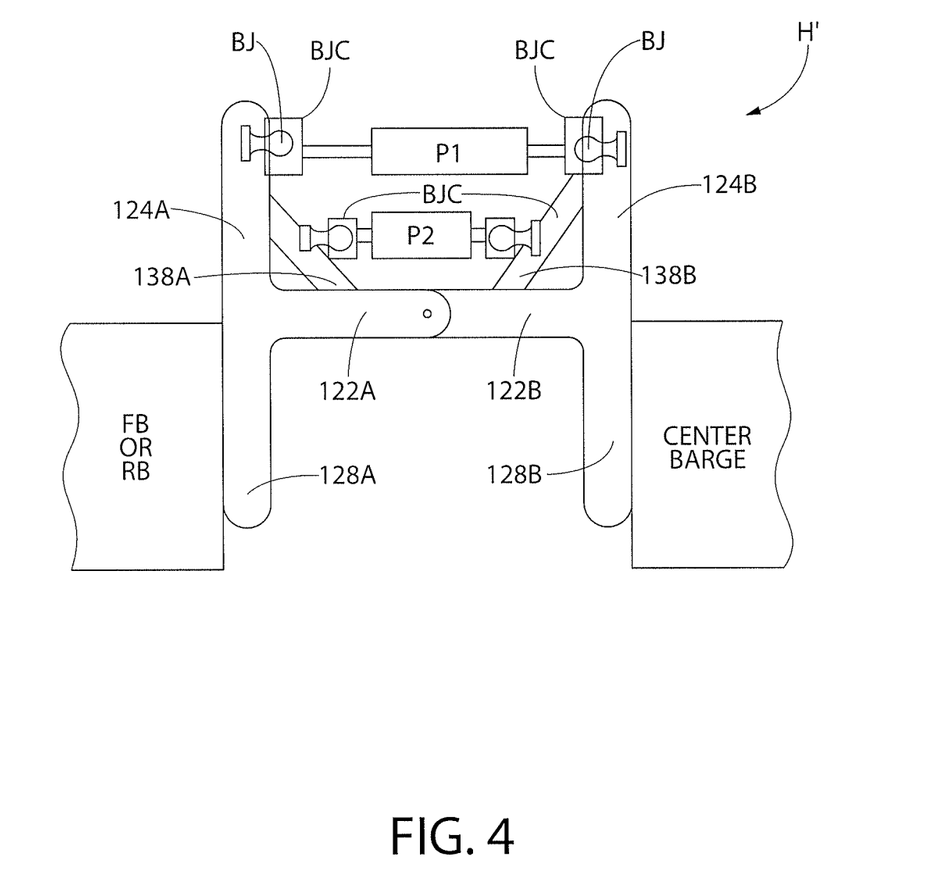
FIG. 4 is another hinge mechanism alternative that permits a multi-level pump attachment configuration.

FIG. 4 depicts another hinge mechanism alternative H' that permits a multi-level pump attachment configuration. In particular, as can be seen in the figure, the hinge H' comprises base members 122A/122B that are hingedly coupled together. The base members 122A/122B are fixedly- and orthogonally-coupled to uprights 124A/124B. Also fixedly coupled to the uprights 124A/124B are angled load struts 138A/138B. Barge struts 128A/128B are fixedly coupled to respective barges. Coupled between opposing uprights 124A/124B are a pair of "stacked" pumps, P1 and P2. Thus, this alternative hinge configuration H' permits one pump P1 to be positioned directly over another pump P2 to enable control and adjustments of barge production as the sea state varies. The pumps P1/P2 are also ball-joint coupled in relation to the uprights 124/124B such that as the hinge H' pivots due to wave motion, the pumps P1/P2 remain horizontal to convert the hinge motion into pump ram/actuator motion. Although not shown, it should be understood that a plurality of these hinge members (as discussed in the previous hinge embodiments) are distributed in the transverse direction along an edge of each facing barge ends. These plurality of hinge members are also connected to form the Warren Truss described previously. Furthermore, as discussed with regard to the earlier embodiments, it should be understood that all of the components (e.g., struts, uprights, etc.) of each hinge mechanism can be formed from discrete components that are fastened together or they may comprise an integrated or unitized structure. Both forms are covered by the broadest scope of the invention. In addition, the use of two pumps, one positioned vertically above the other, is by way of example only and it is also within the broadest scope of the invention to have more than two pumps vertically positioned over one another.

Thus, as can be appreciated in view of the foregoing, there is flexture in the hinge system when the barges/hinge system are exposed to the random wave conditions. The axle segments, AS, over their cycle life, develop "slop" within the bracing BR. The same occurs with the pump P connections. Since the pumps have flexure in articulation, the use of the ball joint coupling (BJ and BJC) provides a looseness at that connection, thereby allowing the reset of the pump connection points, during the change in articulation of the hinge. When the AWECS is positioned at sea, millions of cycles over a period of months will be encountered, so the axle segments AS between the barges FB/CB and RB/CB will loosen slightly. The bearings will wear, but the resistance of the bracing BR to failure will still be present. If the end of each pump were rigidly attached in one of the direction, (e.g., in the x-axis), but cannot rotate about the y axis, that rigidity is where the stress will be accumulated. It should be emphasized that the present invention is directed to the instantaneous change of direction stress to be relieved, thereby allowing the orientation of the pumps to remain loose until the hinge has moved in the opposite direction. The present invention 20 prevents the event, where random waves may hit the articulating barges, putting lateral stress, slight as it may be, on the attachment point when the pumps are changing direction with the dominant wave direction and the vessel is reacting to the wave crest or wave trough at that given time. As such, the omni-directional stress relief is in reference to the ball hitch connection (e.g., the ball joint BJ) on the Warren Truss WT. In particular, the piston pumps typically comprise a hard seal that has flexure or wipe capability to preclude the pumped fluid (e.g., sea water, hydraulic fluid, etc.) from passing to the other side of the piston head during pressurization. This seal can be compromised by the multi-axis forces impinging on the barges. However, by using the hinge system 20 of the present invention, this system separates or reduces the multi-axis forces at the ball joint coupling, thereby eliminating or minimizing the variability of movement on the piston ram end of the pump. Furthermore, the use of the ball joint configuration also provides modularity for at-sea change of components, as well as stress relief for reliability considerations.

While the invention has been described in detail and with reference to specific examples thereof, it will be apparent to one skilled in the art that various changes and modifications can be made therein without departing from the spirit and scope thereof.

What is claimed is:

1. A hinge system that provides omni-directional stress relief to at least one piston pump positioned across a gap between at least two floating members that are hinged together, the at least two floating members pivoting about an axis perpendicular to a common longitudinal axis of said at least two floating members and said at least one piston pump positioned across the gap, aligned with the longitudinal axis, said hinge system comprising:

a plurality of bracing assemblies, said plurality of bracing assemblies forming pairs such that a first portion of each pair is fixedly coupled to a first floating member and a second portion of each pair is fixedly coupled to a second floating member, and wherein said first portion and said second portion are hingedly coupled to each other using an axle segment to permit the first floating member to pivot with respect to the second floating member due to wave motion;

a first truss positioned transversely along a first end of said first floating member and to which each of said first portions is fixedly coupled and a second truss positioned transversely along a first end of said second floating member, opposite to said first end of said first floating member, and to which each of said second portions is fixedly coupled, said first and second trusses comprising at least one set of corresponding universal couplings between which the at least one piston pump is coupled, thereby providing omni-directional stress relief to the at least one piston pump by allowing movement of the piston pump in directions other than the longitudinal axis due to multi-axis forces imposed by the wave motion on said first and second floating members; and wherein said at least one piston pump is a linear piston pump having an extendable/retractable piston for transforming wave motion into pump energy.

2. The hinge system of claim 1 wherein said corresponding universal couplings comprise a ball joint positioned on said first or second truss and a ball joint coupling positioned on each end of said at least one piston pump that couples to a respective ball joint.

3. The hinge system of claim 2 wherein said ball joint coupling comprises a releasable coupling with said ball joint.

4. The hinge system of claim 1 wherein each of said first portions comprises an upper stop strut and each of said second portions comprises an upper stop strut, said upper stop strut of each of said first portions making contact with a corresponding upper stop strut of a corresponding second portion to prevent said first floating member and said second floating member from pivoting away from each when said hinge system moves toward a predetermined downward position.

5. The hinge system of claim 1 wherein each of said first portions comprises a lower stop strut and each of said second portions comprises a lower stop strut, said lower stop strut of each of said first portions making contact with a corresponding lower stop strut of a corresponding second portion to prevent said first floating member and said second floating member from pivoting any closer to each when said hinge system moves toward a predetermined upward position.

6. The hinge system of claim 1 wherein each of said first and second trusses are Warren Trusses.

7. A method of providing omni-directional stress relief to at least one piston pump positioned across a gap between at least two floating members that are hinged together, the at least one piston pump being operable when wave motion causes the at least two floating members to pivot, the at least one piston pump having two ends, said method comprising:

securing a first portion of bracing assembly pairs to one end of a first floating member and securing a second portion of said bracing assembly pairs to one end of a second floating member that faces said first floating member;

pivotally coupling said first and second portions of said bracing assembly pairs together using an axle segment such that said first and second floating members can pivot about an axis perpendicular to a common longitudinal axis of said first and second floating members;

providing a universal coupling member on a respective truss to which said first and second portions are secured; and connecting the ends of the at least one piston pump to respective universal coupling members positioned on respective trusses such that the at least one pump is positioned across the gap, said universal coupling members providing omni-directional stress relief to said at least one pump by allowing movement of said at least one pump in directions other than said longitudinal axis due to multi-axis forces imposed by the wave motion on said first and second floating members, said at least one piston pump comprising a linear piston pump having an extendable/retractable piston for transforming wave motion into pump energy.

8. The method of claim 7 wherein said step of connecting the ends comprises securing respective trusses transversely along facing ends of said first floating member and said second floating member and wherein said universal coupling members are secured to a top portion of each of said trusses.

9. The method of claim 8 wherein said step of connecting the ends comprises connecting the ends of the at least one piston pump to a ball joint positioned on said respective trusses.

10. The method of claim 8 wherein said step of connecting comprises releasably coupling the ends of the at least one piston pump to said ball joints.

11. The method of claim 7 further comprising the step of providing an upper stop strut to each of said first portions and an upper stop strut to each of said second portions, said upper stop strut of each of said first portions making contact with a corresponding upper stop strut of a corresponding second portion to prevent said first floating member and said second floating member from pivoting away from each when said hinge system moves toward a predetermined downward position.

12. The method of claim 7 further comprising the step of providing a lower stop strut to each of said first portions and a lower stop strut to each of said second portions, said lower stop strut of each of said first portions making contact with a corresponding lower stop strut of a corresponding second portion to prevent said first floating member and said second floating member from pivoting any closer to each when said hinge system moves toward a predetermined upward position.

13. The method of claim 9 wherein each of said trusses are Warren Trusses.

14. A hinge system that provides omni-directional stress relief to at least two piston pumps positioned in parallel position above the other and both positioned across a gap between at least two floating members that are hinged together, the at least two floating members pivoting about an axis perpendicular to a common longitudinal axis of said at least two floating members and said at least two piston pumps positioned across the gap, aligned with the longitudinal axis, said hinge system comprising:

a plurality of bracing assemblies, said plurality of bracing assemblies forming pairs such that a first portion of each pair is fixedly coupled to a first floating member and a second portion of each pair is fixedly coupled to a second floating member, and wherein said first portion and said second portion are hingedly coupled to each other using an axle segment to permit the first floating member to pivot with respect to the second floating member due to wave motion;

a first truss positioned transversely along a first end of said first floating member and to which each of said first portions is fixedly coupled and a second truss positioned transversely along a first end of said second floating member, opposite to said first end of said first floating member, and to which each of said second portions is fixedly coupled, said first and second trusses comprising a first set of corresponding universal couplings between which a first one of said at least two piston pumps is coupled, thereby providing omni-directional stress relief to the first one of said at least two piston pumps by allowing movement of the first one of said at least two piston pumps in directions other than the longitudinal axis due to multi-axis forces imposed by the wave motion on said first and second floating members;

said first and second portions comprising a second set of corresponding universal couplings between which a second one of said at least two piston pumps is coupled, thereby providing omni-directional stress relief to the second one of said two piston pumps by allowing movement of the second one of said two piston pumps in directions other than the longitudinal axis due to multi-axis forces imposed by the wave motion on said first and second floating members;

wherein said first set of corresponding universal couplings is located above said second set of universal couplings such that said first one of said at least two piston pumps is positioned above said second one of said at least two piston pumps; and wherein said at least two piston pumps are each a linear piston pump having an extendable/retractable piston for transforming wave motion into pump energy.

15. The hinge system of claim 14 wherein said first set of corresponding universal couplings comprises a ball joint positioned on said first and second truss and a ball joint coupling positioned on each end of said first one of said at least two piston pumps, and wherein said second set of corresponding universal couplings comprises a ball joint on said first and second portions and a ball joint coupling positioned on each end of said second one of said at least two piston pumps.

16. The hinge system of claim 15 wherein said ball joint coupling comprises a releasable coupling with said ball joint.

17. A method of providing omni-directional stress relief to two piston pumps positioned in parallel position above the other and both positioned across a gap between at least two floating members that are hinged together, the piston pumps being operable when wave motion causes the at least two floating members to pivot, said method comprising:

securing a first portion of bracing assembly pairs to one end of a first floating member via a first truss and securing a second portion of said bracing assembly pairs to one end of a second floating member, that faces said first floating member, via a second truss;

pivotally coupling said first and second portions of said bracing assembly pairs together using a plurality of axle segments such that said first and second floating members can pivot about an axis perpendicular to a common longitudinal axis of said first and second floating members;

providing a first set of corresponding universal couplings on on said first and second trusses;

connecting ends of a first one of the two piston pumps between said first set of corresponding universal couplings so that the first one of the two piston pumps is positioned across the gap, said first set of corresponding universal coupling providing omni-directional stress relief to said first one of the two piston pumps by allowing movement of said first one of the two piston pumps in directions other than said longitudinal axis due to multi-axis forces imposed by the wave motion on said first and second floating members;

providing a second set of corresponding universal couplings on said first and second portions which are positioned beneath said first set of corresponding universal couplings on said first and second trusses;

connecting ends of a second one of said two piston pumps between said second set of universal couplings so that said second one of said two piston pumps is also positioned across the gap and beneath the first one of said two piston pumps, said second set of corresponding universal couplings providing omni-directional stress relief to the second one of said two piston pumps by allowing movement of the second one of said two piston pumps in directions other than the longitudinal axis due to multi-axis forces imposed by the wave motion on said first and second floating members, said two piston pumps each comprising a linear piston pump having an extendable/retractable piston for transforming wave motion into pump energy.

18. The method of claim 17 wherein said step of securing a first portion comprises securing said first and second trusses transversely along facing ends of said first floating member and said second floating member, respectively, and wherein said first set of corresponding universal coupling members are secured to a top portion of each of said trusses.

19. The method of claim 18 wherein said step of connecting the ends of the first one of the two piston pumps comprises connecting the ends of the first one of said two piston pumps to a ball joint positioned on said first and second trusses.

20. The method of claim 18 wherein said step of connecting the ends of the second one of said two piston pumps comprises connecting the ends of the second one of said two piston pumps to a ball joint positioned on said on said first and second portions.

21. The method of claim 18 wherein said step of connecting the ends of the first one of the two piston pumps comprises releasably coupling the ends of the first one of said two piston pumps to respective ball joints on said first and second trusses.

* * * * *